(12) United States Patent
Colosky

(10) Patent No.: US 6,510,396 B1
(45) Date of Patent: Jan. 21, 2003

(54) SYMMETRY COMPENSATION FOR ENCODER PULSE WIDTH VARIATION

(75) Inventor: Mark Philip Colosky, Vassar, MI (US)

(73) Assignee: Delphi Technologies, Inc., Troy, MI (US)

( * ) Notice: Subject to any disclaimer, the term of this patent is extended or adjusted under 35 U.S.C. 154(b) by 146 days.

(21) Appl. No.: 09/661,221

(22) Filed: Sep. 13, 2000

Related U.S. Application Data

(60) Provisional application No. 60/154,055, filed on Sep. 16, 1999.

(51) Int. Cl.[7] .............................................. G01D 18/00
(52) U.S. Cl. ...................... 702/85; 180/412; 280/441.1; 303/191; 318/560; 370/436
(58) Field of Search .............................. 702/85, 86, 87, 702/88, 89, 90, 94, 95, 96, 105, 106; 73/118.01; 180/421, 422, 443, 446; 701/22, 41

(56) References Cited

U.S. PATENT DOCUMENTS

| | | | | |
|---|---|---|---|---|
| 3,731,533 A | | 5/1973 | Geery ........................ 73/861.78 |
| 4,008,378 A | * | 2/1977 | Nance et al. ................. 370/436 |
| 4,437,061 A | | 3/1984 | Shinozaki et al. ............ 324/166 |
| 4,562,399 A | | 12/1985 | Fisher .......................... 322/94 |
| 4,803,425 A | | 2/1989 | Swanberg ................... 324/173 |
| 4,836,319 A | * | 6/1989 | Haseda et al. ............... 180/412 |
| 4,838,074 A | | 6/1989 | Morishita et al. ........... 73/118.1 |
| 4,897,603 A | | 1/1990 | Bieber et al. ............. 324/207.2 |
| 4,922,197 A | | 5/1990 | Juds et al. ............. 324/207.21 |
| 4,924,161 A | | 5/1990 | Ueki et al. ................... 318/567 |
| 4,924,696 A | | 5/1990 | Schroeder ................... 73/118.1 |
| 4,955,228 A | | 9/1990 | Hirose et al. ............... 73/118.1 |
| 4,961,017 A | | 10/1990 | Kakinoki et al. .............. 310/71 |
| 4,983,915 A | | 1/1991 | Rossi ..................... 324/207.17 |
| 5,027,648 A | | 7/1991 | Filleau ....................... 73/118.1 |
| 5,029,466 A | | 7/1991 | Nishihara et al. .......... 73/118.1 |
| 5,088,319 A | | 2/1992 | Hirose et al. ............... 73/118.1 |
| 5,218,279 A | * | 6/1993 | Takahashi et al. ........... 318/560 |
| 5,223,760 A | | 6/1993 | Peck et al. ................... 310/168 |
| 5,293,125 A | | 3/1994 | Griffen et al. ............... 324/173 |
| 5,309,758 A | | 5/1994 | Kubota et al. .............. 73/118.1 |
| 5,329,195 A | | 7/1994 | Horber et al. ............ 310/68 B |
| 5,406,267 A | * | 4/1995 | Curtis ......................... 340/653 |
| 5,408,153 A | | 4/1995 | Imai et al. ..................... 310/68 |
| 5,498,072 A | * | 3/1996 | Shimizu ...................... 303/191 |
| 5,503,421 A | * | 4/1996 | DeLisser et al. .......... 280/441.1 |
| 5,717,268 A | | 2/1998 | Carrier et al. ................. 701/41 |
| 5,736,852 A | | 4/1998 | Pattantyus ................... 324/166 |
| 5,828,973 A | | 10/1998 | Takeuchi et al. .............. 701/41 |
| 5,902,342 A | | 5/1999 | Mishra ......................... 701/22 |
| 6,155,106 A | | 12/2000 | Sano ........................ 73/118.1 |
| 6,244,372 B1 | | 6/2001 | Sakamaki et al. ........... 180/422 |
| 6,244,373 B1 | | 6/2001 | Kojo et al. .................. 180/443 |
| 6,246,197 B1 | * | 6/2001 | Kurishige et al. ........... 318/432 |
| 6,250,417 B1 | | 6/2001 | Kaji et al. ................... 180/421 |
| 6,286,621 B1 | | 9/2001 | Mukai et al. ................ 180/446 |

FOREIGN PATENT DOCUMENTS

| | | |
|---|---|---|
| DE | 1 484 796 | 2/1975 |
| JP | 8-211081 | 8/1996 |

* cited by examiner

*Primary Examiner*—John S. Hilten
*Assistant Examiner*—John Le
(74) *Attorney, Agent, or Firm*—Edmund P. Anderson

(57) ABSTRACT

A method of compensating for errors in the measurement of the kinematic properties of an electric power steering motor for an automobile is disclosed. The method comprises generating a set of M-ary signals; measuring the pulse width of the set of M-ary signals; and measuring the time between the edges of the set of M-ary signals. The motor velocity may be directly measured by a tachometer or other such device. The motor position signal can be used to estimate the angular velocity of the motor, by determining the change in angular position of the motor divided by the change in time.

30 Claims, 3 Drawing Sheets

SYMMETRY COMPENSATION FOR ENCODER PULSE WIDTH VARIATION

CROSS REFERENCE TO RELATED APPLICATIONS

This application claims benefit of U. S. Provisional Patent Application No. 60/154,055 filed on Sep. 16, 1999, the entire contents of which are incorporated herein by reference.

TECHNICAL FIELD

This invention relates to compensating for errors in the measurement of the kinematic properties of an electric power steering motor for an automobile.

BACKGROUND OF THE INVENTION

An electric power steering apparatus for a motor vehicle or automobile typically uses an electric motor to assist an operator in applying the necessary torque required to steer the vehicle. When the vehicle is steered with a steering wheel operably connected to a set of road wheels, a sensor in the electric power steering apparatus detects the angular position and/or velocity of the motor. A signal is then sent from the sensor to an electric controller. The electric controller controls the magnitude and direction of the steering assist provided by the electric motor. The electric motor drives a reducing gear, typically a worm gear engaging a worm wheel, that lessens the torque required to turn the steering wheel. Electric steering systems often utilize a motor with a digital encoder for a position sensor.

Electric power steering systems for motor vehicles may require motor velocity as part of the control law. In order to estimate the motor velocity, either a time derivative of motor position or direct measurement of motor velocity must be performed. In order to minimize the cost and complexity of the motor sensing subsystem, a relatively low resolution position sensor is desireable. A technology used for this motor sensing function includes a magnetic target with corresponding magnetic sensors (i.e., Hall Sensors). One problem of utilizing this approach is the potential variability of the output signals. A second problem with this approach is that at low motor velocities, the low resolution of the sensor does not provide sufficient angular input resolution for a time base derivative where the position change is variable and the time base is constant. Therefore, the time base derivative must be based on a constant position change and a variable time base. This causes the derivative to be very sensitive to errors in the angular position signal.

SUMMARY OF THE INVENTION

A method of compensating for errors in the measurement of the kinematic properties of an electric power steering motor for an automobile is disclosed. The method comprises generating a set of M-ary signals; measuring the pulse width of the set of M-ary signals; and measuring the time between the edges of the set of M-ary signals. The motor position signal can be used to estimate the angular velocity of the motor, by determining the change in angular position of the motor divided by the change in time.

DESCRIPTION OF THE PREFERRED EMBODIMENTS

Figure 1:
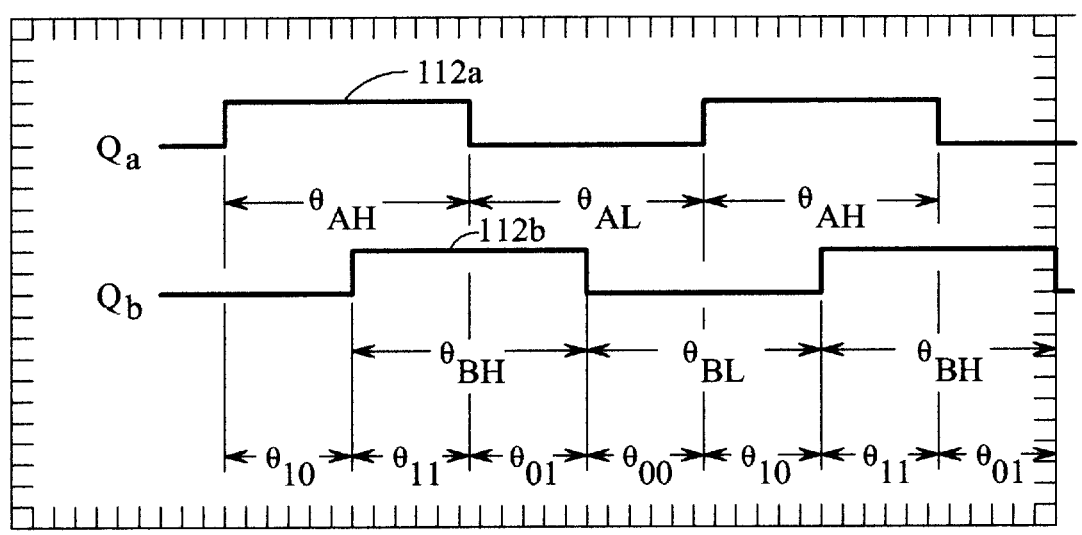
FIG. 1 is a diagram of a set of idealized binary symmetric signals in quadrature.
Figure 2:
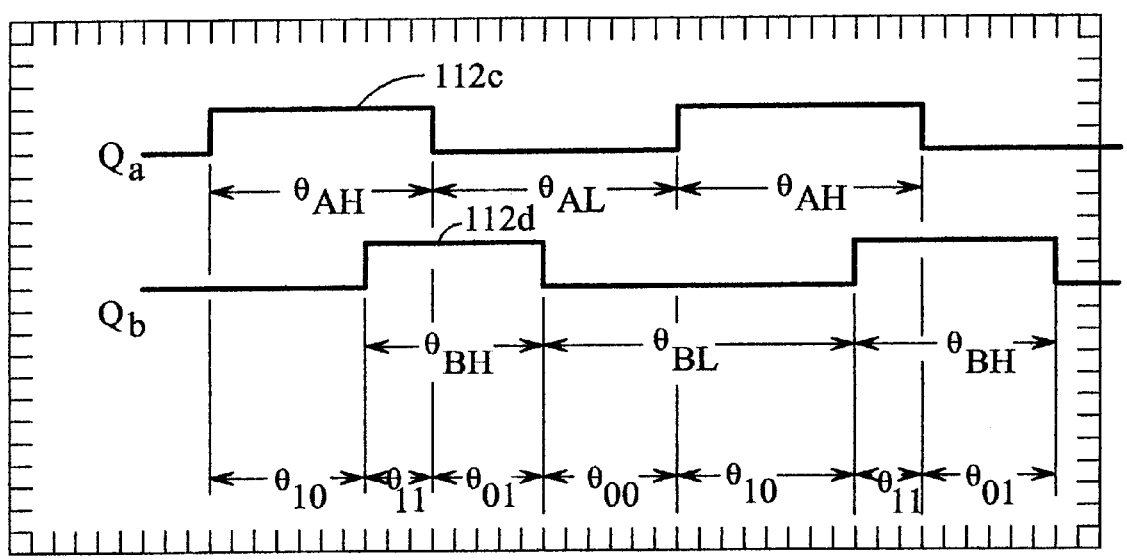
FIG. 2 is a diagram of a set of real binary non-symmetric signals not in quadrature.
Figure 3:
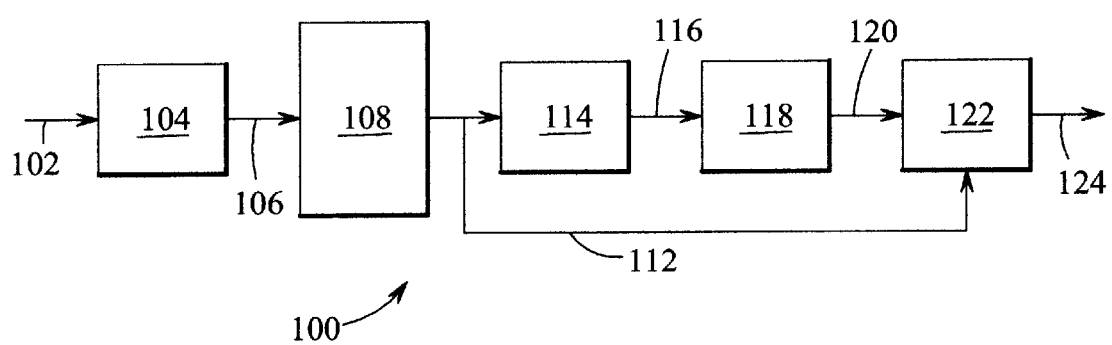
FIG. 3 is a block diagram of a control system for implementing a method of compensating for errors in the measurement of the kinematic properties of a motor.

Referring to FIG. 3, a control system for implementing the method of compensating for errors in the measurement of the kinematic properties of a motor of the present invention is shown generally at 100. The control system 100 comprises a pulse encoded position sensor target 104 attached to a motor shaft (not shown) as the rotating half of a motor position sensor system 104, 108. Typical position sensor targets utilize slotted disks, etched glass or magnetic disks. The position sensor target 104 is operative to accept as input thereto the motor angular position signal 102. The position sensor target 104 provides as output a signal 106. A position sensor receiver 108, for example Hall sensors, are attached to the non-rotating part of the motor and accept the signal 106 as input thereto. The position sensor receiver 108 provides as output a set of M-ary phase shifted signals 112 as seen at 112a, 112b, 112c, 112d in FIGS. 1 and 2. The output 112 from the position sensor receiver 108 is typically a pulse train and a direction signal which represents the speed and direction of the motor or is comprised of two digital signals in quadrature (i.e., 90 degrees phase offset). The quadrature signal 112 is in the nature of a pulse train indicative of the kinematic properties of the motor such as relative angular position, $\theta_r$, of the motor shaft. The output signal 112 is provided as input to an edge triggered timer 114 for measuring the time between the edges of the incoming pulses. Signal 112 is also provided to a symmetry compensator 122. The timer 114 provides as output a signal 116 indicative of the time between the pulses of the quadrature signal 112. The calculation of the angular velocity of the motor shaft is based upon the fundamental relationship between position and velocity, i.e., $\omega = d\theta/dt$. The uncompensated change in the angular position of the motor shaft, $\theta_u$, is fixed for each sensor and is computed as follows: $\theta_u = 360/N$, where N is the number of discrete sensor edges per revolution. Since the time between edges (dt) is measured at 114, the uncompensated velocity, $v_u$ 120, is computed at 118 as $v_u = \theta_u/dt$. The uncompensated or velocity, $v_u$ 120, contains errors associated with errors in the measurement of the angular position, $\theta$, of the motor shaft (e.g. errors due to the mechanical positioning of the sensors at 104), including errors in signal symmetry and phase relationship. A symmetry compensation function 122 accepts as input thereto digital signals 112, 120 to determine the appropriate symmetry correction term, $K_s$, to be applied to the uncompensated velocity, $v_u$. The corrected velocity 124 is $v_c = v_u \times K_s$, where $K_s$ is a constant for the pulse width being used and s=H, L, 00, 01, 10, 11.

For a single waveform the symmetry correction calculations are as follows:

$$\theta_u = \frac{360}{N} = \frac{(\theta_H + \theta_L)}{2} \tag{1}$$

$$D_H = \frac{\theta_H}{\theta_u} \tag{2a}$$

$$D_L = \frac{\theta_L}{\theta_u} \tag{2b}$$

$$v = \frac{\Delta\theta}{\Delta t} \tag{3a}$$

$$v_u = \frac{\theta_u}{t_{measured}} \tag{3b}$$

$$v_{cH} = \frac{\theta_H}{t_{measured}} = \frac{D_H \cdot \theta_u}{t_{measured}} = D_H \cdot v_u \tag{4a}$$

$$v_{cL} = \frac{\theta_L}{t_{measured}} = \frac{D_L \cdot \theta_u}{t_{measured}} = D_L \cdot v_u \tag{4b}$$

where N is the number of measurable pulses per mechanical (or electrical) cycle, $D_H$ and $D_L$ are the duty cycles of the sensor state (High or Low), $I_{measured}$ is the time measured between pulses and $v_c$ is the corrected angular velocity.

For a quadrature waveform the symmetry correction calculations are as follows:

$$\theta_u = \frac{360}{N} = \frac{(\theta_{10} + \theta_{11} + \theta_{01} + \theta_{00})}{4} \tag{5}$$

$$D_{10} = \frac{\theta_{10}}{\theta_u} \tag{6a}$$

$$D_{11} = \frac{\theta_{11}}{\theta_u} \tag{6b}$$

$$D_{01} = \frac{\theta_{01}}{\theta_u} \tag{6c}$$

$$D_{00} = \frac{\theta_{00}}{\theta_u} \tag{6d}$$

$$v = \frac{\Delta\theta}{\Delta t} \tag{7a}$$

$$v_u = \frac{\theta_u}{t_{measured}} \tag{7b}$$

$$v_{c10} = \frac{\theta_{10}}{t_{measured}} = \frac{D_{10} \cdot \theta_u}{t_{measured}} = D_{10} \cdot v_u \tag{8a}$$

$$v_{c11} = \frac{\theta_{11}}{t_{measured}} = \frac{D_{11} \cdot \theta_u}{t_{measured}} = D_{11} \cdot v_u \tag{8b}$$

$$v_{c01} = \frac{\theta_{01}}{t_{measured}} = \frac{D_{01} \cdot \theta_u}{t_{measured}} = D_{01} \cdot v_u \tag{8c}$$

$$v_{c00} = \frac{\theta_{00}}{t_{measured}} = \frac{D_{00} \cdot \theta_{nom}}{t_{measured}} = D_{00} \cdot v_u \tag{8d}$$

In order to develop a low cost position and velocity sensing subsystem, a magnetic encoder is utilized for the motor position sensor target 104. The motor position sensor target 104 may be comprised of a magnetic disk (or cylinder) attached to the motor shaft. The position sensor receivers 108 are comprised of two Hall sensors that are spaced to yield a quadrature signal output 112. The quadrature signals 112 are used to compute the relative angular position, $\theta_r$, of the motor shaft as part of the position sensing subsystem 104, 108. Additionally, the quadrature signals 112 are provided as input into an edge triggered capture timer 114. The corresponding pulse widths can be computed by subtracting the difference in the timer values between the two edges. This value can be used to compute the nominal velocity $v_u$. By monitoring the state of the inputs, the velocity value can be compensated in software. For the single waveform case:

$$\theta_u = \frac{\theta_H + \theta_L}{2} \tag{9}$$

$$\theta_L = 2 \cdot \theta_u - \theta_H \tag{10}$$

$$D_H = \frac{\theta_H}{\theta_u} \tag{11a}$$

$$D_L = \frac{\theta_L}{\theta_u} = \frac{2 \cdot \theta_u - \theta_H}{\theta_u} = 2 - \frac{\theta_H}{\theta_u} = 2 - D_H \tag{11b}$$

In order to simplify the implementation in a fixed point computational environment, the value of $D_H$ is assigned a convenient fractional equivalent, i.e., $D_H = 2^{-n} \times K_H$ where n is a convenient integer. For example for n=7, $$D_H = \frac{K_H}{128} \tag{12a}$$

$$D_L = 2 - D_H = 2 - \frac{K_H}{128} = \frac{256 - K_H}{128} \tag{12b}$$

This relationship between $D_H$ and $D_L$ allows for the storage of only one calibration constant for the single waveform case.

For the quadrature waveform case $$\theta_u = \frac{(\theta_{10} + \theta_{11} + \theta_{01} + \theta_{00})}{4} \tag{13}$$

$$D_{10} = \frac{\theta_{10}}{\theta_u} \tag{14a}$$

$$D_{11} = \frac{\theta_{11}}{\theta_u} \tag{14b}$$

$$D_{01} = \frac{\theta_{01}}{\theta_u} \tag{14c}$$

$$D_{00} = \frac{\theta_{00}}{\theta_u} \tag{14d}$$

In order to simplify the implementation in a fixed point computational environment, the value of the duty cycles $D_{10}$, $D_{11}$, $D_{01}$, $D_{00}$ are assigned convenient fractional equivalents. Thus $$D_{10} = \frac{K_{10}}{128} \tag{15a}$$

$$D_{11} = \frac{K_{11}}{128} \tag{15b}$$

$$D_{01} = \frac{K_{01}}{128} \tag{15c}$$

$$D_{00} = \frac{K_{00}}{128} \tag{15d}$$

Thus, the corrected velocity provided for motor control at 124 is $v_{cs} = v_u \times K_s / 128$. It will be appreciated by one skilled in the art that the aforesaid method of compensating for errors in the measurement of the velocity of a motor may also be made by making correction to the nominal position of the motor shaft, $\theta_u$, instead of to the nominal velocity, $v_u$.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be understood that a person skilled in the art may make modifications to the preferred embodiment shown herein within the scope and intent of the claims. While the present invention has been described as carried out in a specific embodiment thereof, it is not intended to be limited thereby but intended to cover the invention broadly within the scope and spirit of the claims.

What is claimed is:

1. A method of compensating for errors in the measurement of the kinematic properties of an electric power steering motor for an automobile, the method comprising:

generating a set of M-ary signals comprising a set of pulses indicative of the angular position of the motor, wherein the pulse widths of the M-ary signals comprise a fraction of a cycle of the M-ary signals;

measuring the pulse width of the set of M-ary signals;

measuring the time between the edges of the set of M-ary signals; and calculating a compensated value of a first kinematic property of the motor;

wherein calculating the compensated value of the first kinematic property of the motor comprises calculating the compensated value of the angular velocity, $v_c$, of the motor according to the equation $$v_c = \theta_s / t_{measured}$$

wherein $\theta_s$ is the pulse width of the set of M-ary signals and $t_{measured}$ is the time between the edges of the set of M-ary signals.

2. The method as set forth in claim 1 further comprising determining an uncompensated value of a second kinematic property of the motor.

3. The method as set forth in claim 2 further comprising calibrating the duty cycles of the set of M-ary signals.

4. The method as set forth in claim 3 further comprising calculating an uncompensated value of the first kinematic property of the motor.

5. The method as set forth in claim 4 wherein calculating an uncompensated value of the first kinematic property of the motor comprises calculating the uncompensated value of the angular velocity, $v_u$, of the motor according to the equation $$v_u = \theta_u \div t_{measured}$$

wherein $\theta_u$ is the uncompensated value of the second kinematic property of the motor and $t_{measured}$ is the time between the edges of the set of M-ary signals.

6. The method as set forth in claim 5 wherein calculating a compensated value of a first kinematic property of the motor includes calculating the compensated value of the angular velocity of the motor according to the equation $v_c = D_s \times v_u$ wherein $D_s$ is the duty cycles of the M-ary signals.

7. The method as set forth in claim 6 wherein the set of M-ary signals comprise binary signals.

8. The method as set forth in claim 7 further comprising assigning a fractional equivalent to the duty cycles of the M-ary signals according to the equation $$D_s = 2^{-n} \times K_s$$

wherein n is an integer.

9. A storage medium encoded with machine-readable program code for compensating for errors in the measurement of the kinematic properties of an electric power steering motor for an automobile, the computer code being executable whereby the computer code when run by a computer system will compensate for errors in the measurement of the kinematic properties of an electric power steering motor for an automobile, the program code including instructions for causing the computer system to implement a method comprising:

generating a set of M-ary signals comprising a set of pulses indicative of the angular position of the motor, wherein the pulse widths of the M-ary signals comprise a fraction of a cycle of the M-ary signals;

measuring the pulse width of the set of M-ary signals;

measuring the time between the edges of the set of M-ary signals; and calculating a compensated value of a first kinematic property of the motor;

wherein calculating the compensated value of the first kinematic property of the motor comprises calculating the compensated value of the angular velocity, $v_c$, of the motor according to the equation $$v_c = \theta_s / t_{measured}$$

wherein $\theta_s$ is the pulse width of the set of M-ary signals and $t_{measured}$ is the time between the edges of the set of M-ary signals.

10. The method as set forth in claim 9 further comprising determining an uncompensated value of a second kinematic property of the motor.

11. The method as set forth in claim 10 further comprising calibrating the duty cycles of the set of M-ary signals.

12. The method as set forth in claim 17 further comprising calculating an uncompensated value of the first kinematic property of the motor.

13. The method as set forth in claim 12 wherein calculating an uncompensated value of the first kinematic property of the motor comprises calculating the uncompensated value of the angular velocity, $v_u$, of the motor according to the equation $$v_u = \theta_u \div t_{measured}$$

wherein $\theta_u$ is the uncompensated value of the second kinematic property of the motor and $t_{measured}$ is the time between the edges of the set of M-ary signals.

14. The method as set forth in claim 13 wherein calculating a compensated value of a first kinematic property of the motor includes calculating the compensated value of the angular velocity of the motor according to the equation $v_c = D_s \times v_u$ wherein $D_s$ is the duty cycles of the M-ary signals.

15. The method as set forth in claim 14 wherein the set of M-ary signals comprise binary signals.

16. The method as set forth in claim 15 further comprising assigning a fractional equivalent to the duty cycles of the M-ary signals according to the equation $$D_s = 2^{-n} \times K_s$$

wherein n is an integer.

17. An error compensating system for compensating for errors in the measurement of a kinematic property of an electric power steering motor, the error compensating system comprising:
 a motor position sensor system receptive of a signal indicative of the kinematic property of the motor and operative thereby to provide as output a set of M-ary phase shifted signals comprising a set of pulses indicative of the angular position of the motor, wherein the pulse widths of the M-ary signals comprise a fraction of a cycle of the M-ary signals; and
 a signal processing system receptive of the set of M-ary phase shifted signals for compensating for errors in the measurement of the kinematic property of the motor, providing as output thereby a signal indicative of a compensated value of the angular velocity, $v_c$, of the motor.

18. The error compensating system as set forth in claim 17 wherein the motor position sensor system comprises:
 a pulse encoded position sensor attached to a shaft of the motor and receptive of the signal indicative of the kinematic property of the motor providing as output a signal indicative of the angular position of the motor; and
 a position sensor receiver attached to a stationary part of the motor and receptive of the output signal from the pulse encoded sensor providing as output the set of M-ary phase shifted signals.

19. The error compensating system as set forth in claim 18 wherein the position sensor receiver comprises a Hall effect sensor.

20. The error compensating system as set forth in claim 17 wherein the pulse encoded position sensor comprises a slotted disk or an etched glass disk or a magnetic disc.

21. The error compensating system as set forth in claim 17 wherein the signal processing system comprises:
 a timing device for measuring the time between the M-ary phase shifted signals providing thereby a signal indicative of the time between the M-ary phase shifted signals;
 a computing device receptive of the signal indicative of the time between the M-ary phase shifted signals from the timing device for computing the uncompensated angular velocity of the motor providing thereby a signal indicative of the uncompensated angular velocity of the motor; and
 a symmetry compensator receptive of the signal indicative of the uncompensated angular velocity of the motor from the computing device and the set of M-ary phase shifted signals from the motor position sensor system for generating a compensated velocity of the motor according to the equation $$v_c = \theta_s / t_{measured}$$

wherein $\theta_s$ is the pulse width of the set of M-ary signals and $t_{measured}$ is the time between the edges of the set of M-ary signals.

22. The error compensating system as set forth in claim 21 wherein the timing device comprises an edge triggered timing device.

23. A method of compensating for errors in the measurement of the kinematic properties of a motor, the method comprising:
 generating a set of M-ary signals comprising a set of pulses indicative of the angular position of the motor, wherein the pulse widths of the M-ary signals comprise a fraction of a cycle of the M-ary signals;
 measuring the pulse width of the set of M-ary signals;
 measuring the time between the edges of the set of M-ary signals; and
 calculating a compensated value of a first kinematic property of the motor;
  wherein calculating the compensated value of the first kinematic property of the motor comprises calculating the compensated value of the angular velocity, $v_c$, of the motor according to the equation $$v_c = \theta_s / t_{measured}$$

wherein $\theta_s$ is the pulse width of the set of M-ary signals and $t_{measured}$ is the time between the edges of the set of M-ary signals.

24. The method as set forth in claim 23 further comprising determining an uncompensated value of a second kinematic property of the motor.

25. The method as set forth in claim 24 further comprising calibrating the duty cycles of the set of M-ary signals.

26. The method as set forth in claim 25 further comprising calculating an uncompensated value of the first kinematic property of the motor.

27. The method as set forth in claim 27 wherein calculating an uncompensated value of the first kinematic property of the motor comprises calculating the uncompensated value of the angular velocity, $v_u$, of the motor according to the equation:

$$v_u = \theta_u \div t_{measured}$$

wherein $\theta_u$ is the uncompensated value of the second kinematic property of the motor and $t_{measured}$ is the time between the edges of the set of M-ary signals.

28. The method as set forth in claim 27 wherein calculating a compensated value of a first kinematic property of the motor includes calculating the compensated value of the angular velocity of the motor according to the equation $v_c = D_s \times v_u$ wherein $D_s$ is the duty cycles of the M-ary signals.

29. The method as set forth in claim 28 wherein the set of M-ary signals comprise binary signals.

30. The method as set forth in claim 29 further comprising assigning a fractional equivalent to the duty cycles of the M-ary signals according to the equation:

$$D_s = 2^{-n} \times K_s$$

wherein n is an integer.

* * * * *